(12) United States Patent
Seabaugh et al.

(10) Patent No.: US 10,783,572 B2
(45) Date of Patent: Sep. 22, 2020

(54) CENTRALIZED ACCOUNTING SYSTEM FOR INVOICE GENERATION ACCESSIBLE VIA COMPUTER NETWORK

(71) Applicant: Wells Fargo Bank, N.A., San Francisco, CA (US)

(72) Inventors: Kathryn Seabaugh, Denver, CO (US); Rishabh Mallick, Denver, CO (US); Philip Perry, Golden, CO (US); Justin Sogge, Parker, CO (US); Mandy Valdes, Englewood, CO (US); Rebecca Stoddard, Atlanta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 283 days.

(21) Appl. No.: 15/861,118

(22) Filed: Jan. 3, 2018

(65) Prior Publication Data

US 2019/0180351 A1    Jun. 13, 2019

Related U.S. Application Data

(60) Provisional application No. 62/597,214, filed on Dec. 11, 2017.

(51) Int. Cl.
G06Q 30/00 (2012.01)
G06Q 30/06 (2012.01)
G06Q 40/00 (2012.01)

(52) U.S. Cl.
CPC ..... *G06Q 30/0637* (2013.01); *G06Q 30/0641* (2013.01); *G06Q 40/12* (2013.12)

(58) Field of Classification Search
USPC ........................................................ 705/26.1
See application file for complete search history.

(56) References Cited

U.S. PATENT DOCUMENTS

| | | | |
|---|---|---|---|
| 6,167,385 | A | 12/2000 | Hartley-Urquhart |
| 7,249,074 | B1 | 7/2007 | Land et al. |
| 8,548,877 | B2 | 10/2013 | Bulman et al. |
| 2003/0191710 | A1 | 10/2003 | Green et al. |

(Continued)

FOREIGN PATENT DOCUMENTS

FR    2979449 A1    3/2013

*Primary Examiner* — Mila Airapetian
(74) *Attorney, Agent, or Firm* — Shumaker & Sieffert, P.A.

(57) ABSTRACT

A centralized accounting system for invoice generation is described as a web-based portal accessible by parties of a supply chain finance relationship via one or more computer networks. The centralized system provides a computer-based, network accessible platform in which a customer and a vendor may negotiate and agree upon terms of a purchase order for products. The centralized system then approves the purchase order based on vendor and customer profile information, and sends a notification of the approved purchase order to a bank. The centralized system automatically generates a vendor invoice for the approved purchase order and submit the vendor invoice to the bank for payment according the terms of the supply chain finance relationship. The centralized system ensures that the vendor invoice is accurate for the approved purchase order. The centralized system may also automatically generate and submit a bank invoice to the customer for the approved purchase order.

20 Claims, 5 Drawing Sheets

(56) References Cited

U.S. PATENT DOCUMENTS

| | | | |
|---|---|---|---|
| 2005/0102192 A1* | 5/2005 | Gerrits | G06Q 30/0629 705/26.64 |
| 2006/0089907 A1* | 4/2006 | Kohlmaier | G06Q 30/04 705/40 |
| 2006/0095367 A1 | 5/2006 | Iverson | |
| 2007/0208656 A1* | 9/2007 | Feaver | G06Q 30/06 705/37 |
| 2014/0046847 A1 | 2/2014 | Jacobs et al. | |
| 2014/0279305 A1 | 9/2014 | Caron et al. | |

* cited by examiner

CENTRALIZED ACCOUNTING SYSTEM FOR INVOICE GENERATION ACCESSIBLE VIA COMPUTER NETWORK

This application claims the benefit of U.S. Provisional Application Ser. No. 62/597,214, filed on Dec. 11, 2017, the entire content of which is incorporated herein by reference.

TECHNICAL FIELD

The disclosure relates to computer networks, and more specifically, web-based portals within computer networks.

BACKGROUND

Supply chain finance involves business and financing processes that link participants in a supply chain in a manner that enables one or more of such participants to improve working capital efficiency. A supply chain involves a customer or buyer that purchases products from a vendor or supplier. In some scenarios, the customer may purchase the products for resale to endpoint customers. As an example, the customer submits a purchase order for the products to the vendor, and the vendor fulfills the purchase order by shipping the products to the customer and/or directly to the endpoint customers, and submits an invoice for the products to the customer.

A lender, bank, or other financial institution may play a role in the supply chain by providing short-term credit to one or more participants in the supply chain. For example, a bank may provide short-term credit to the customer by paying a vendor invoice on behalf of the customer according to shortened payment terms (e.g., immediately or less than 30 days). The bank may require a discount from the vendor in exchange for early payment of the vendor invoice, which frees up cash flow for the vendor. The bank, in turn, submits its own invoice to the customer with lengthened payment terms (e.g., 60 or 90 days), which optimizes working capital for the customer.

SUMMARY

In general, this disclosure describes a centralized accounting system for invoice generation as a web-based portal accessible by parties of a supply chain finance relationship via one or more computer networks. For example, a customer, a vendor, and a bank in a supply chain finance relationship may use the centralized system to avoid invoice discrepancies that can be complicated and costly to resolve, particularly for the bank. The disclosed centralized system provides a computer-based, network accessible platform in which a customer and a vendor may negotiate and agree upon terms of a purchase order for products. The centralized system then approves the purchase order based on vendor and customer profile information, and sends a notification of the approved purchase order to the bank. In addition, the centralized system automatically generates a vendor invoice for the approved purchase order and submit the vendor invoice to the bank for payment according the terms of the supply chain finance relationship. Since the purchase order was approved by the centralized system, the centralized system ensures that the vendor invoice is accurate for the approved purchase order. The centralized system may also automatically generate and submit a bank invoice to the customer for the approved purchase order according the terms of the supply chain finance relationship.

In one example, the disclosure is directed to a computer-implemented method comprising receiving, by a computing device and from a customer device in communication with the computing device via a network, an initial purchase order for one or more products offered by a vendor; upon receipt of the initial purchase order, establishing, by the computing device, a communication channel between the customer device and a vendor device of the vendor to facilitate negotiation of one or more parameters of the initial purchase order, wherein the vendor device is in communication with the computing device via the network; and receiving, by the computing device, a final purchase order that includes one or more final parameters based on the negotiated parameters of the initial purchase order. The computer-implemented method further comprises approving, by the computing device, the final purchase order, wherein approving the final purchase order comprises analyzing the one or more final parameters of the final purchase order based on at least one of a vendor profile or a customer profile; generating, by the computing device, a vendor invoice based on the approved final purchase order; and sending, by the computing device and to a server of a financial institution, the vendor invoice for payment by the financial institution to the vendor on behalf of the customer, wherein the server is in communication with the computing device via the network.

In another example, the disclosure is directed to a computing device comprising a memory configured to store at least one of a vendor profile or a customer profile, and one or more processors in communication with the memory. The one or more processors are configured to receive, from a customer device in communication with the computing device via a network, an initial purchase order for one or more products offered by a vendor; upon receipt of the initial purchase order, establish a communication channel between the customer device and a vendor device of the vendor to facilitate negotiation of one or more parameters of the initial purchase order, wherein the vendor device is in communication with the computing device via the network; receive a final purchase order that includes one or more final parameters based on the negotiated parameters of the initial purchase order; approve the final purchase order, wherein, to approve the final purchase order, the one or more processors are configured to analyze the one or more final parameters of the final purchase order based on at least one of a vendor profile or a customer profile; generate a vendor invoice based on the approved final purchase order; and send, to a server of a financial institution, the vendor invoice for payment by the financial institution to the vendor on behalf of the customer, wherein the server is in communication with the computing device via the network.

In a further example, the disclosure is directed to a non-transitory computer-readable storage medium comprising instructions that when executed cause one or more processors of a computing device to receive, from a customer device in communication with the computing device via a network, an initial purchase order for one or more products offered by a vendor; upon receipt of the initial purchase order, establish a communication channel between the customer device and a vendor device of the vendor to facilitate negotiation of one or more parameters of the initial purchase order, wherein the vendor device is in communication with the computing device via the network; and receive a final purchase order that includes one or more final parameters based on the negotiated parameters of the initial purchase order. The instructions further cause the one or more processors to approve the final purchase order, wherein, to approve the final purchase order, the instructions cause the one or more processors to analyze the one or more final parameters of the final purchase order based on at least one of a vendor profile or a customer profile; generate a vendor invoice based on the approved final purchase order; and send, to a server of a financial institution, the vendor invoice for payment by the financial institution to the vendor on behalf of the customer, wherein the server is in communication with the computing device via the network.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
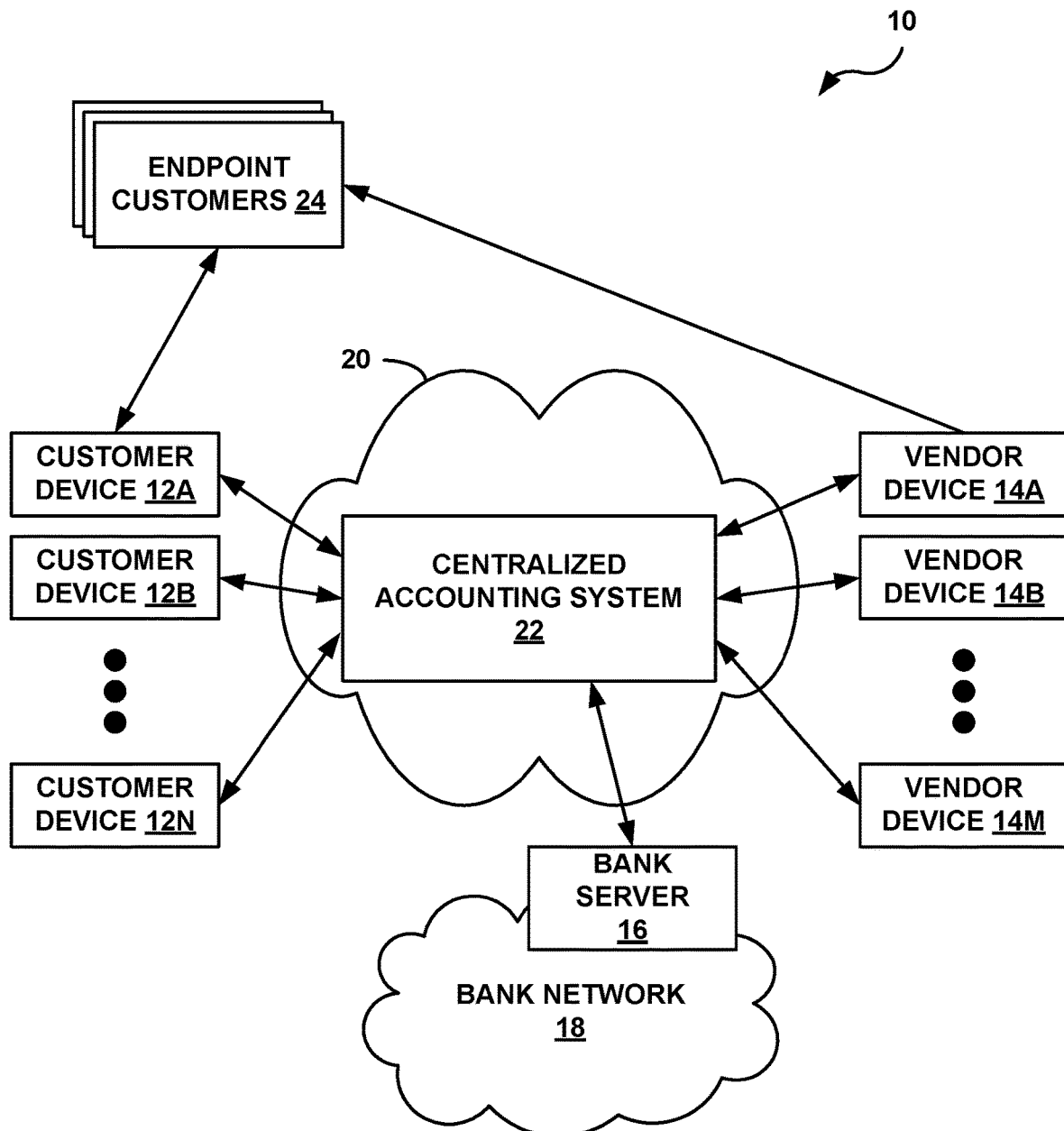
FIG. 1 is a block diagram illustrating an example computer network including a centralized accounting system for invoice generation, in accordance with the techniques of this disclosure.

FIG. 1 is a block diagram illustrating an example computer network 10 including a centralized accounting system 22 for invoice generation, in accordance with the techniques of this disclosure. As illustrated in FIG. 1, computer network 10 includes centralized accounting system 22 within a network 20 that is accessible by customer devices 12A-12N ("customer devices 12"), vendor devices 14A-14M ("vendor devices 14"), and a bank server 16 of a bank network 18. In addition, one or more of customer devices 12 and vendor devices 14 may be in communication with one or more endpoint customers 24 either via network 20, another network, or a non-network based means of communication. In some examples, each of customer devices 12 may represent a different customer of the bank or other financial institution of bank network 18, a different representative of a single customer of the bank, or some combination thereof. Similarly, each of vendor devices 14 may represent a different vendor, a different representative at a single vendor, or some combination thereof.

At least one of customer devices 12, at least one of vendor devices 14, and bank server 16 may be parties of a supply chain finance relationship. For example, customer device 12A may be associated with a customer or buyer that purchases products (i.e., goods or services) from a vendor or supplier associated with vendor device 14A. In some scenarios, customer device 12A may purchase the products for resale to endpoint customers 24. As an example, customer device 12A may submit a purchase order for the products to vendor device 14A, and the vendor associated with vendor device 14A fulfills the purchase order by shipping the products either to the customer associated with customer device 12A or to endpoint customers 24.

A bank or other financial institution of bank network 18 may play a role in the supply chain by providing short-term credit to one or more participants in the supply chain. For example, the bank may provide short-term credit to the customer associated with customer device 12A by paying a vendor invoice to the vendor associated to vendor device 14A on behalf of the customer according to shortened payment terms (e.g., immediately or less than 30 days). The bank may require a discount from the vendor associated with vendor device 14A in exchange for early payment of the vendor invoice, which frees up cash flow for the vendor. The bank, in turn, submits its own invoice to the customer associated with customer device 12A with lengthened payment terms (e.g., 60 or 90 days), which optimizes working capital for the customer.

Customer devices 12 and vendor devices 14 may each comprise any of a wide range of user devices, including laptop or desktop computers, tablet computers, so-called "smart" phones, "smart" pads, "smart" watches, Internet of Things (IoT) devices, or other personal digital appliances equipped for wired or wireless communication. Each of customer devices 12 and vendor devices 14 may include at least one user interface device (not shown) that enables a user of the respective computing device to interact with the computing device. In some examples, the user interface devices of customer devices 12 and vendor devices 14 may be configured to receive tactile, audio, or visual input. In addition to receiving input from the user, the user interface devices of either customer devices 12 or vendor devices 14 may be configured to output content such as a graphical user interface (GUI) for display, e.g., at a display device associated with the respective computing device.

As shown in FIG. 1, customer devices 12, vendor devices 14, and bank server 16 of bank network 18 communicate with centralized accounting system 22 via network 20. Network 20 may comprise a public network, such as the Internet, or a private network associated with the bank or a third-party entity. Although illustrated as a single entity, network 20 may comprise a combination of public and/or private networks. In some examples, network 20 may comprise one or more of a wide area network (WAN) (e.g., the Internet), a local area network (LAN), a virtual private network (VPN), or another wired or wireless communication network.

Bank network 18 may be a private network associated with the bank or other financial institution. Bank network 18 may comprise a centralized or distributed system of computing devices, such as desktop computers, laptops, workstations, wireless devices, network-ready appliances, file servers, print servers, or other devices. For example, bank network 18 may include a plurality of databases, data centers, and other storage facilities in which customer credentials and customer financial accounts, e.g., checking, savings, credit, or loan accounts, are stored. In addition, bank network 18 may include a plurality of computing devices configured to manage the customer financial accounts and process internally- and externally-generated transactions with the customer financial accounts. Bank network 18 may further include a plurality of access servers, e.g., bank server 16, configured to receive invoices and other communications from centralized accounting system 22 regarding supply chain finance relationships with customer devices 12 and vendor devices 14.

Centralized accounting system 22 may include a centralized system of computing devices including one or more access servers (not shown in FIG. 1) that host website portals through which external computing devices, e.g., customer devices 12, vendor devices 14, and bank server 16, may securely access centralized accounting system 22. An example of a computing device of centralized accounting system 22 is described in more detail below with respect to FIG. 2.

In a typical supply chain finance relationship, the bank receives a vendor invoice from the vendor for a purchase order between the customer and the vendor, but the bank is not aware of the parameters of the purchase order. The bank, therefore, treats the received vendor invoice as accurate because it has no way to verify the vendor invoice. The bank may not learn of any inaccuracies in the vendor invoice until the bank has already paid the vendor invoice on the shortened payment terms and subsequently sent the bank invoice to the customer for payment on the lengthened payment terms. At that time, the customer may indicate to the bank that the bank invoice does not match the purchase order between the customer and the vendor. In the situation where the vendor invoice is inaccurate, it often falls to the bank to reconcile the discrepancy between the amount the bank already paid the vendor based on the incorrect vendor invoice and the amount the customer is willing to pay to the bank based on the purchase order. In other words, the bank operates as a middle man such that discrepancies between invoices and purchase orders must be resolved by bank representatives. Resolving these discrepancies is difficult and time consuming because the bank has no knowledge of the purchase order between the customer and the vendor.

Although electronic accounting systems may make invoicing easier for the parties involved, especially in high volume scenarios, electronic accounting system may also make it more difficult for representatives of the involved parties to recognize anomalies in individual invoices. For example, in the case of a supply chain financial relationship, the vendor's representative my mistype a vendor invoice number into the bank's electronic accounting system, and the mistake may not be noticed until the bank or the customer performs an audit to reconcile purchase orders and invoices.

This disclosure describes centralized accounting system 22 as a web-based portal that provides integration between customers, venders, and the bank in a supply chain finance relationship. According to the disclosed techniques, centralized accounting system 22 provides a user interface through which a customer's representative, via one of customer devices 12, e.g., customer device 12A, and network 20, enters an initial purchase order for products from a vender, and through which the vendor's representative, via one of vendor devices 14, e.g., vendor device 14A, and network 20, at least views the initial purchase order. Centralized account system 22 further provides a communication platform that enables the customer's representative and the vendor's representative, through their respective devices 12A, 14A, to negotiate and agree upon a final purchase order.

Centralized accounting system 22 approves the final purchase order based on vendor and customer profile information. The vendor profile information may include preset parameter ranges that represent the vendor's capabilities and pricing structure. The customer profile information may at least include a preset credit limit for the customer, which be the line of credit extended to the customer by the bank as part of the supply chain finance relationship. Upon approval of the final purchase order, centralized accounting system 22 may send a notification of the approved final purchase order to bank server 16. In addition, centralized accounting system 22 automatically generates a vendor invoice for the approved final purchase order and submits the vendor invoice to bank server 16 for payment according the terms of the supply chain finance relationship. Centralized accounting system 22 may also automatically generate and submit a bank invoice to the customer for the approved final purchase order according the terms of the supply chain finance relationship.

In this way, all parties of the supply chain finance relationship are aware of or have access to the final purchase order. Since the final purchase order is approved by centralized accounting system 22 prior to generating the vendor invoice, centralized accounting system 22 ensures that the vendor invoice is accurate for the approved final purchase order. Centralized accounting system 22, therefore, avoids duplicate or incorrect vendor invoices from being sent to the bank from the vender, and the time and money spent by the bank to reconcile discrepancies between invoices and purchase orders.

The architecture of computer network 10 illustrated in FIG. 1 is shown for exemplary purposes only and should not be limited to this architecture. Computer network 10 illustrated in FIG. 1 shows a single bank server 16 of bank network 18 in communication with centralized accounting system 22. In other examples, bank network 18 may include multiple different bank servers configured to communicate with centralized accounting system 22. In still other examples, computing network 10 may include multiple different bank networks associated with one or more banks or other financial institutions, and each of the bank networks may include at least one bank server configured to communicate with centralized accounting system 22.

Figure 2:
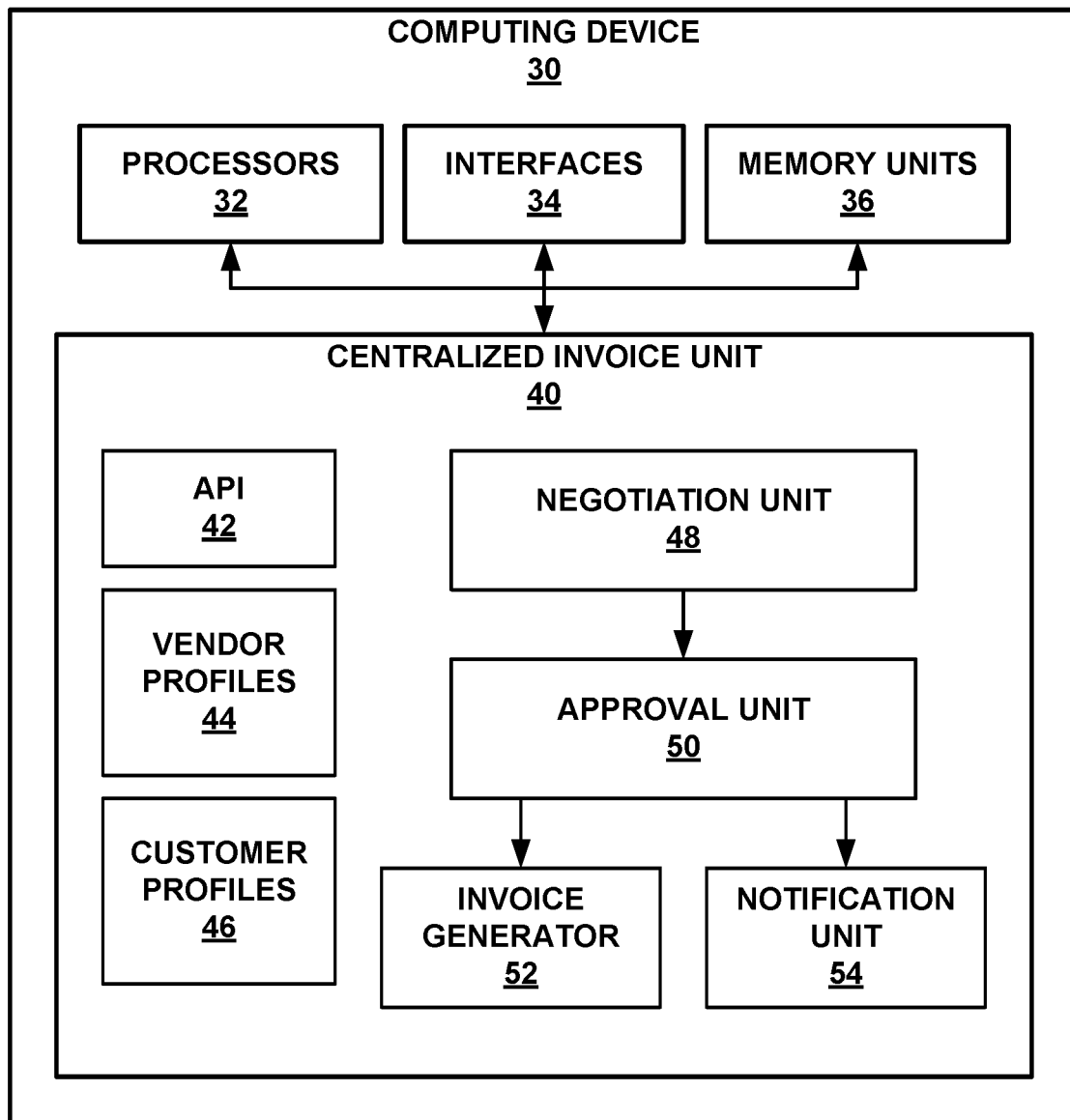
FIG. 2 is a block diagram illustrating an example computing device of the centralized accounting system from FIG. 1, in accordance with the techniques of this disclosure.

FIG. 2 is a block diagram illustrating an example computing device 30 of centralized accounting system 22 from FIG. 1, in accordance with the techniques of this disclosure. As described above, centralized accounting system 22 may include a centralized system of computing devices including computing device 30 configured to host a website portal through which external computing devices, e.g., customer devices 12, vendor devices 14, and bank server 16, may securely access centralized accounting system 22. The architecture of computing device 30 illustrated in FIG. 2 is shown for exemplary purposes only. Computing device 30 should not be limited to the illustrated example architecture. In other examples, computing device 30 may be configured in a variety of ways.

As shown in the example of FIG. 2, computing device 30 includes one or more processors 32, one or more interfaces 34, one or more memory units 36. Computing device 30 also includes centralized invoice unit 40, which may be implemented as program instructions and/or data stored in memory units 36 and executable by processors 32 or implemented as one or more hardware units or devices of computing device 30. Memory units 36 of computing device 30 may also store an operating system (not shown) executable by processors 32 to control the operation of components of computing device 30. The components, units or modules of computing device 30 are coupled (physically, communicatively, and/or operatively) using communication channels for inter-component communications. In some examples, the communication channels may include a system bus, a network connection, an inter-process communication data structure, or any other method for communicating data.

Processors 32, in one example, may comprise one or more processors that are configured to implement functionality and/or process instructions for execution within computing device 30. For example, processors 32 may be capable of processing instructions stored by memory units 36. Processors 32 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 36 may be configured to store information within computing device 30 during operation. Memory units 36 may include a computer-readable storage medium or computer-readable storage device. In some examples, memory 28 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 36 are used to store program instructions for execution by processors 32. Memory units 36 may be used by software or applications running on computing device 30 (e.g., centralized invoice unit 40) to temporarily store information during program execution.

Computing device 30 may utilize interfaces 34 to communicate with external devices via one or more networks, e.g., network 20 of FIG. 1. Interfaces 34 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 30 utilizes interfaces 34 to wirelessly communicate with external devices, e.g., customer devices 12, vendor devices 14, or bank server 16 of bank network 18 from FIG. 1, or other computing devices within network 20.

In the illustrated example of FIG. 2, centralized invoice unit 40 includes an application programming interface (API) 42, vendor profiles 44, customer profiles 46, a negotiation unit 48, an approval unit 50, an invoice generator 52, and a notification unit 54.

According to the disclosed techniques, negotiation unit 48 performs functions to provide a secure portal to receive and present parameters of a purchase order, and facilitate negotiation of the parameters of the purchase order between a customer's representative via a customer device and a vendor's representative via a vendor device, e.g., customer device 12A and vendor device 14A of FIG. 1. More specifically, negotiation unit 48 provides a user interface through which the customer's representative via customer device 12A enters an initial purchase order for products from a vender, and through which the vendor's representative via vendor device 14A can at least view the initial purchase order. An example of the user interface provided by negotiation unit 48 to customer device 12A and vendor device 14A, is described in more detail below with respect to FIG. 3.

Upon receipt of the initial purchase order from customer device 12A, negotiation unit 48 establishes a communication channel between customer device 12A and vendor device 14A. In some examples, establishing the communication channel may include instantiating a communication platform, e.g., an instant messaging or chat platform, in the user interface presented to customer device 12A and vendor device 14A. In some examples, negotiation unit 48 may use a communication platform as a service (CPaaS) cloud-based delivery model to provide real-time communication (e.g., short message service (SMS), multimedia messaging service (MMS), telephony, video) to customer devicer 12A and vendor device 14A via API 42.

The customer's representative and the vendor's representative may then use the communication platform provided by negotiation unit 48 to negotiate one or more parameters of the initial purchase order via their respective devices 12A, 14A. The communication channel established between customer device 12A and vendor device 14A may be secure such that the purchase order negotiations are confidential. Negotiation unit 48 subsequently receives a final purchase order that includes one or more final parameters based on the negotiated parameters of the initial purchase order.

According to the disclosed techniques, approval unit 50 performs functions to approve the final purchase order received from negotiation unit 48 prior to the generation of the vendor and bank invoices based on the final purchase order to ensure invoice accuracy. More specifically, approval unit 50 analyzes the final parameters of the final purchase order based on vendor profiles 44 and customer profiles 46. Approval unit 50 may compare each of the final parameters of the final purchase order to an associated preset parameter range indicated in the one of vendor profiles 44 for the vendor. Approval unit 50 may further compare a total price of the final purchase order to a preset credit limit for the customer indicated in the one of customer profiles 46 for the customer. A more detailed example of the purchase order approval process performed by approval unit 50 is described below with respect to FIG. 4.

Each of vendor profiles 44 may be associated with a different vendor that has a relationship with the bank, and may include preset parameter ranges based on capabilities and pricing structure of the given vendor. The preset parameter ranges may be manually set by the vendor or at least partially determined or updated by centralized invoice unit 50. Each of customer profiles 46 may be associated with a different customer that has a relationship with the bank, and may at least include a preset credit limit for the given customer, which may be the line of credit extended to the given customer by the bank as part of the supply chain finance relationship. In some scenarios, API 42 may be used to access or expose portions of the customer's system and/or the vendor's system in order to directly pull the information included in each of vendor profiles 44 and/or customer profiles 46.

Upon approval of the final parameters of the final purchase order, approval unit 50 may generate an approval number for inclusion on a vendor invoice for the approved final purchase order and/or inclusion on a notification to the bank of the approved final purchase order. As described above, in accordance with the disclosed techniques, all parties of the supply chain finance relationship, including the bank, are aware of or have access to the final purchase order. For example, notification unit 54 may send advance notification of the approved final purchase order to bank server 16 including the approval number.

Invoice generator 52 generates a vendor invoice based on the approved final purchase order and including the approval number. Invoice generator 52 may generate the vendor invoice with either immediate or shortened payment terms (e.g., less than 30 days) per the supply chain finance relationship, the details of which may be included in the one of vendor profiles 44 for the vendor. Computing device 30 then sends the vendor invoice to bank server 16 via interfaces 34.

In addition, invoice generator 52 may generate a bank invoice based on the approved final purchase order. Invoice generator 52 may generate the bank invoice with lengthened payment terms (e.g., 60 or 90 days) per the supply chain finance relationship, the details of which may be included in the one of customer profiles 46 for the customer. Computing device 30 then sends the bank invoice to customer device 12A via interfaces 34. According to the disclosed techniques, the automatically generated vendor invoice and bank invoice will be accurate because they are based on the approved final purchase order.

Although primary described herein as automatically generating invoices based on approved purchase orders, centralized invoice unit 40 may also perform an invoice approval process for externally prepared invoices based on approved purchase orders. As one example, the vendor's representative may manually enter a prepared vendor invoice for the approved final purchase order into centralized invoice unit 40, e.g., via a user interface provided by approval unit 50. As another example, API 42 may be used to access or expose a portion of the vendor's system to pull an invoice prepared by the vendor for the approved final purchase order into centralized invoice unit 40. Approval unit 50 may then approve the prepared vendor invoice based on the final parameters of the approved final purchase order and the one of the vendor profiles 44 and the one of the customer profiles 46, in a similar manner as described above. Once the prepared vendor invoice is approved, computing device 30 may send the prepared vendor invoice to bank server 16 via interfaces 32. In addition, invoice generator 52 may generate the bank invoice based on the approved final purchase order, as described above.

Figure 3:
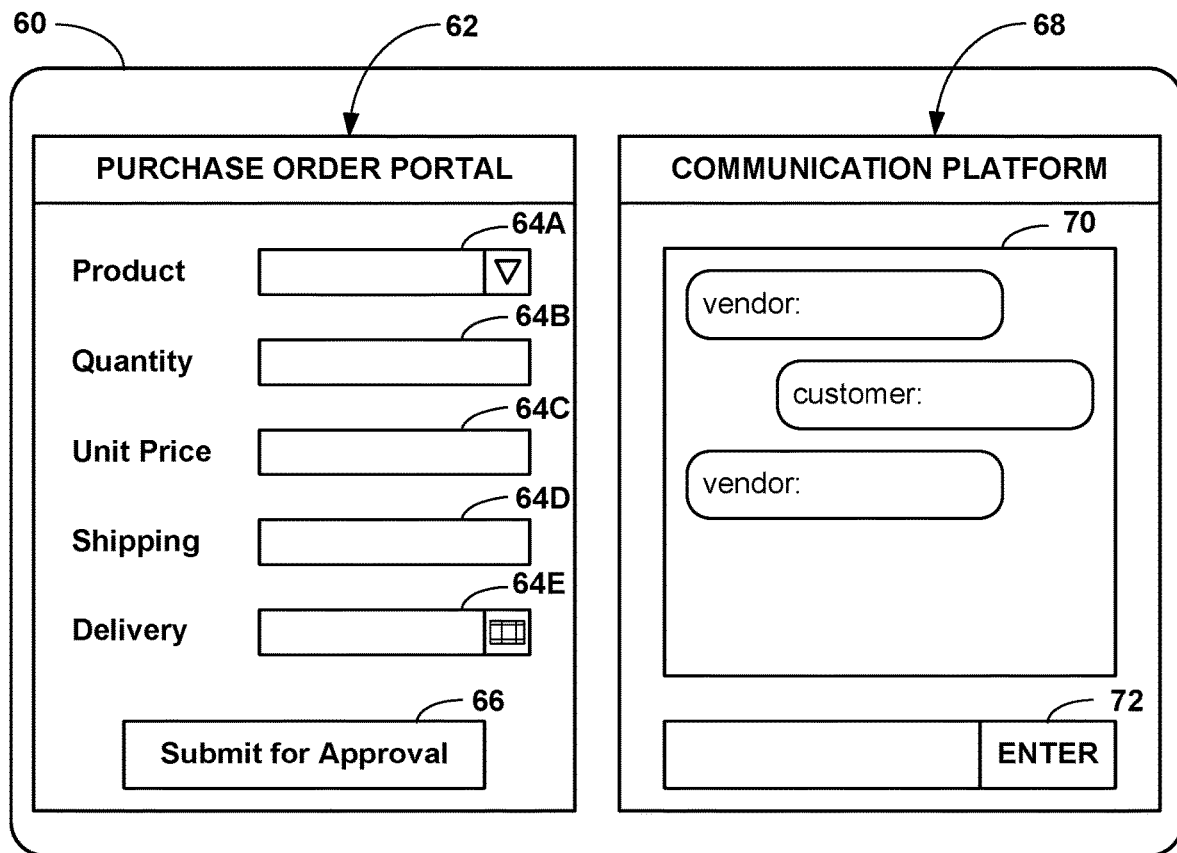
FIG. 3 is a conceptual diagram illustrating an example user interface of a purchase order negotiation portion of the centralized accounting system, in accordance with the techniques of this disclosure.

FIG. 3 is a conceptual diagram illustrating an example user interface 60 of a purchase order negotiation portion of the centralized accounting system, in accordance with the techniques of this disclosure. As part of the purchase order negotiation between the customer and the vendor via centralized accounting system 22, negotiation unit 48 may send data representative of user interface 60 to customer device 12A and vendor device 14A. In the illustrated example, user interface 60 includes a purchase order portal 62 configured to receive and present parameters of a purchase order, and a communication platform 68 configured to enable messaging over a communication channel established between customer device 12A and vendor device 14A. In this way, communication platform 68 may facilitate negotiation of the parameters of the purchase order between customer device 12A and vendor device 14A.

In the example illustrated in FIG. 3, a customer's representative may interact with purchase order portal 62 of user interface 60 on customer device 12A to enter parameters of an initial purchase order for one or more products offered by a vendor associated within vendor device 14A. In addition, the customer's representative may later modify the parameters of the initial purchase order entered into purchase order portal 62 via customer device 12A based on negotiation with the vendor's representative, and submit the negotiated parameters as final parameters of a final purchase order. For example, purchase order portal 62 includes fillable fields 64 for the customer's representative to specify the parameters of the initial purchase order including, for example, a product 64A, a quantity of the product 64B, a unit price of the product 64C, a shipping cost 64D, and a delivery date 64E. In other examples, purchase order portal 62 may include additional or other fillable fields designed to capture the parameters needed for a complete purchaser order.

Purchase order portal 62 also includes a "submit for approval" button 66. Upon entering the final parameters of the final purchase order into fields 64, the customer's representative selects the "submit for approval" button 66 via customer device 12A to trigger the approval process of the final purchase order performed by approval unit 50 of computing device 30 of centralized accounting system 22.

As described above, the final parameters of the final purchase order may be determined based on negotiation of the parameters of the initial purchase order. In the example illustrated in FIG. 3, the customer's representative and the vendor's representative may engage in such negotiation, at least in part, by interacting with communication platform 68 of user interface 60 on customer device 12A and vendor device 14A. For example, communication platform 68 includes a conversation display region 70 configured to present messages entered by customer device 12A and vendor device 14A, and a text entry region 72 where the customer's representative and the vendor's representative are able to enter text, images, document links, and the like via their respective devices 12A, 14A to be the next message presented in conversion display region 70. In the example of FIG. 3, communication platform 68 comprises an instant messaging platform or a chat platform. In other examples, communication platform 68 may comprise an SMS, MMS, telephony, video, or other platform. In still other examples, communication platform 68 may comprise a CPaaS cloud-based delivery model for real-time communication.

In one scenario, only customer device 12A has access rights to enter and modify the parameters of the initial purchase order in purchase order portal 62, and vendor device 14A may only present a read-only or uneditable version of the initial purchase order. In this scenario, after the parameters of the initial purchase order are entered into fields 64 of purchase order portal 62 via customer device 12A, negotiation unit 48 may send a notification to vendor device 14A and instantiate communication platform 68. The customer's representative and the vendor's representative may then negotiate the parameters of the initial purchase order via communication platform 68. When agreement is reached, the customer's representative may modify one or more of the parameters in fields 64 of purchase order portal 62 via customer device 12A to be the final parameters of the final purchase order.

In another scenario, both customer device 12A and vendor device 14A may have access rights to modify the parameters of the initial purchase order in purchase order portal 62. In this scenario, after the parameters of the initial purchase order are entered into fields 64 of purchase order portal 62 via customer device 12A, negotiation unit 48 may send a notification to vendor device 14A. The customer's representative and the vendor's representative may then negotiate the parameters of the initial purchase order by each modifying the parameters in fields 64 to essentially present a new "offer" for the purchase order. The parameter modification may continue until the parameters entered into fields 64 are agreed upon. This back-and-forth modification of the parameters in fields 64 may be accompanied by messages exchanged between customer device 12A and vendor device 14A via communication platform 68. In some cases, the "submit for approval" button 66 may only be presented in the version of user interface 60 on customer device 12A such that the customer's representative is responsible for determining when agreement has been reached.

Figure 4:
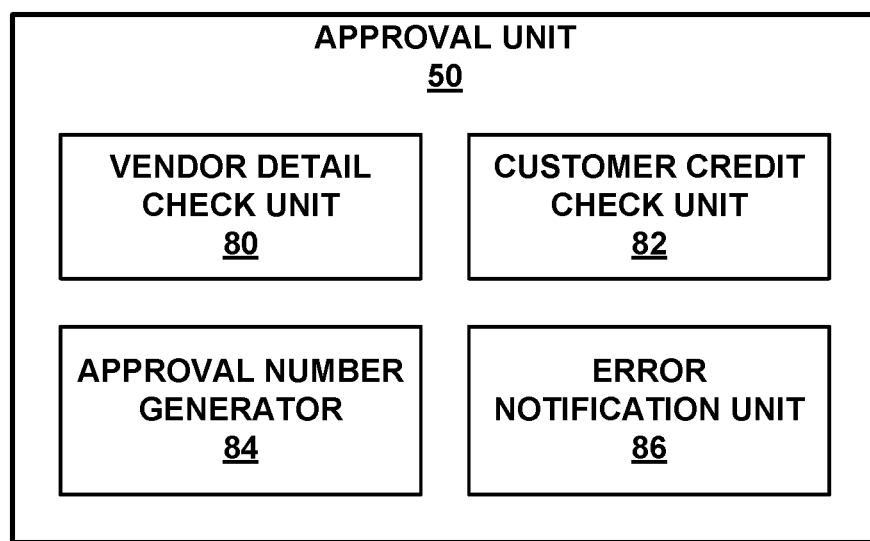
FIG. 4 is a block diagram illustrating an example of a purchase order approval portion of the centralized accounting system, in accordance with the techniques of this disclosure.

FIG. 4 is a block diagram illustrating an example of a purchase order approval portion of the centralized accounting system, in accordance with the techniques of this disclosure. As described above with respect to FIG. 2, approval unit 50 of computing device 30 performs functions to approve final purchase orders prior to the generation of vendor and bank invoices to ensure invoice accuracy.

Figure 5:
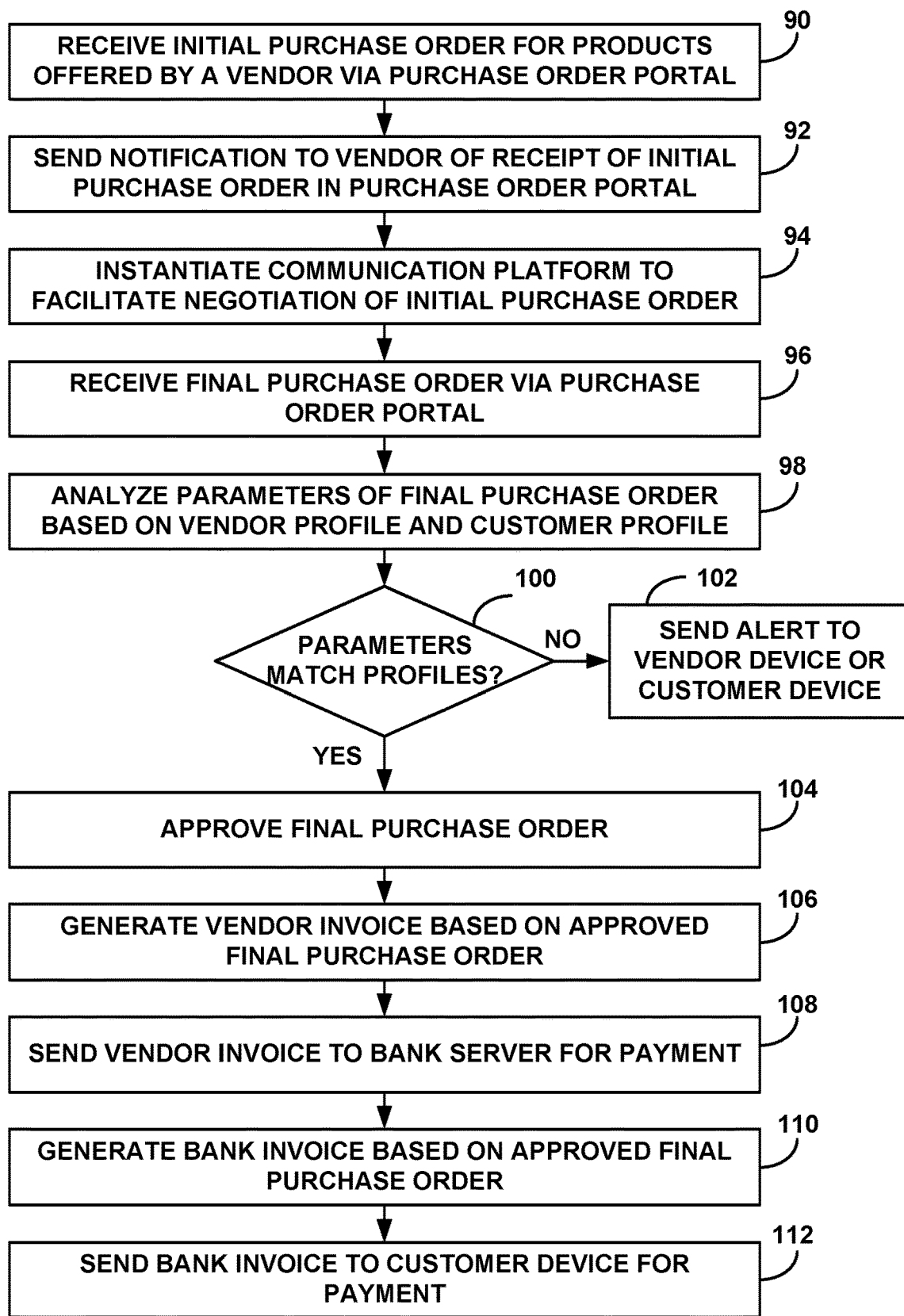
FIG. 5 is a flowchart illustrating an example operation of a computing device of a centralized accounting system automatically generating accurate invoices for a supply chain finance relationship, in accordance with the techniques of this disclosure.

In the example of FIG. 5, approval unit 50 includes a vendor detail check unit 80, a customer credit check unit 82, an approval number generator 84, and a notification unit 86. Approval unit 50 receives a final purchase order that includes one or more final parameters from negotiation unit 48. The final parameters may include a product or SKU, quantity, unit price, taxes, shipping cost, and delivery date. As described above, negotiation unit 48 provides a secure portal through which a customer and a vendor may negotiate the initial parameters of an initial purchase agreement until reaching the final parameters of the final purchase order. Approval unit 50 analyzes the one or more final parameters of the final purchase order based one of customer profiles 46 associated with the customer and one of vendor profiles 44 associated with the vendor.

Vendor detail check unit 80 may compare each of the final parameters of the final purchase order to an associated preset parameter range indicated in the one of vendor profiles 44 for the vendor. Preset parameter ranges may be set for each of product quantity, unit price, taxes, shipping cost, delivery date, and the like. For example, the preset parameter ranges for product quantity and delivery date may represent the capabilities of the vendor known to centralized accounting system 22 with respect to inventory, availability of materials, and production times. As another example, the preset parameter ranges for unit price, taxes, and shipping cost may represent the pricing structure of the vendor known to centralized accounting system 22 with respect to price sheets, volume discounts, tax brackets, and third-party shipping contracts. The preset parameter ranges stored in the one of the vendor profiles 44 may be manually set by the vendor or may be at least partially determined by centralized accounting system 22 based on information provided by the vendor.

In this way, if the final parameters of the final purchase order do not match with the preset parameter ranges included in the one of vendor profiles 44, vendor detail check unit 80 may catch data entry errors by the vendor's representative during the negotiation process via negotiation unit 48. According to the disclosed techniques, vendor detail check unit 80 may also catch calculation errors by the vendor's representative that could cause the vendor to promise product or timelines that are beyond the vendor's capabilities or charge more or less than they should according to the vendor's pricing structure.

In addition, customer credit check unit 82 may determine whether a total price of the final purchase order is within a preset credit limit for the customer indicated in the one of customer profiles 46 for the customer. The preset credit limit may be the line of credit extended to the customer by the bank as part of the supply chain finance relationship. In this way, if the total price of the final purchase order does not match with the preset credit limit included in the one of customer profiles 46, customer credit check unit 82 may catch a data entry error by the customer's representative during the negotiation process via negotiation unit 48. According to the disclosed techniques, customer credit check unit 82 may also catch calculation errors or knowledge gaps by the customer's representative that could cause the customer to exceed their credit limit.

In the case where either the final parameters do not match with the present parameter ranges for the vendor or the total price does not match with the preset credit limit for the customer, the final purchase order is not approved and error notification unit 86 sends an alert to the vendor or the customer, respectively. In some examples, approval unit 50 may return the final purchase order to negotiation unit 48 for correction and potential further negotiation between the vendor and the customer. In other examples, approval unit 50 may request centralized invoice unit 40 to instantiate a communication channel between the customer and the bank to discuss the customer's credit limit.

In the case where the final parameters match with the present parameter ranges for the vendor and the total price matches with the preset credit limit for the customer, the final purchase order is approved. Approval number generator 84 then generates an approval number for the final purchase order and provides the approval number along with the final purchase order to invoice generator 52. In some examples, approval number generator 84 may also provide the approval number to notification unit 54 for inclusion with an advance notification to the bank of the approved final purchase order.

FIG. 5 is a flowchart illustrating an example operation of a computing device of a centralized accounting system automatically generating accurate invoices for a supply chain finance relationship, in accordance with the techniques of this disclosure. The example operation of FIG. 5 is described with respect to computing device 30 of FIG. 2 as a computing device within centralized accounting system 22 of FIG. 1.

As illustrated in FIG. 1, centralized account system 22 may be a web-based portal accessible by parties of a supply chain finance relationship, i.e., customer devices 12, vendor devices 14, and bank server 16, via network 20. As described with respect to FIG. 3, computing device 30 hosts a purchase order portal 62 and a communication platform 68 for use by customer devices 12 and vendor devices 14 to negotiate parameters of purchase orders. For example, computing device 30 may send data representative of a user interface 60 that includes the purchase order portal 62 and/or the communication platform 68 to each of customer devices 12 and vendor devices 14.

Computing device 30 receives from one of customer devices 12, e.g., customer device 12A, an initial purchase order for one or more products offered by a vendor associated within one of vendor devices 14, e.g., vendor device 14A, via purchase order portal 62 (90). Computing device 30 sends a notification to vendor device 14A of receipt of the initial purchase order in purchase order portal 62 (92). Upon receipt of the initial purchase order, computing device 30 instantiates communication platform 68 included in user interface 60 to facilitate negotiation of one or more parameters of the initial purchase order between customer device 12A and vendor device 14A (94). Computing device 30 receives a final purchase order that includes one or more final parameters based on the negotiated parameters of the initial purchase order via purchase order portal 62 (96). In some examples, receipt of the final purchase order may comprise receipt of an input to purchase order portal 62 from customer device 12A indicating approval of the negotiated parameters of the initial purchase order.

Computing device 30 analyzes the one or more final parameters of the final purchase order based on associated profiles in vendor profiles 44 and customer profiles 46 (98). In some examples, computing device 30 may compare each of the final parameters of the final purchase order to an associated preset parameter range indicated in the one of vendor profiles 44 for the vendor. Computing device 30 may then approve or reject the final parameters based on whether at least one of the final parameters is outside of its associated preset parameter range. In other examples, computing device 30 may determine whether a total price of the final purchase order is within a preset credit limit for the customer indicated in the one of customer profiles 46 for the customer. The preset credit limit may be the line of credit extended to the customer by the bank as part of the supply chain finance relationship.

If the final parameters of the final purchase order do not match with preset data included in the profiles (NO branch of 100), computing device 30 sends an alert to vendor device 14A and/or customer device 12A (102). In some examples, computing device 30 may return the final purchase order to purchase order portal 62 and again instantiate communication platform 68 to enable customer device 12A and/or vendor device 14A to correct the final parameters of the final purchase order. In other examples, computing device 30 may instantiate a communication channel between customer device 12A and bank server 16 to enable the customer and a bank representative to discuss the customer's credit limit.

If the final parameters of the final purchase order match with preset data included in the profiles (YES branch of 100), computing device 30 approves the final purchase order (104). Computing device 30 automatically generates a vendor invoice based on the approved final purchase order (106). Computing device 30 then sends to bank server 16 the vendor invoice for payment by the bank to the vendor on behalf of the customer (108). Upon approval of the final purchase order, computing device 30 may generate an approval number for inclusion on the vendor invoice for the approved final purchase order. In some cases, prior to generating the vendor invoice, computing device 30 may send to bank server 16 advance notification of the approved final purchase order including the approval number. Computing device 30 may generate the vendor invoice with either immediate or shortened payment terms (e.g., less than 30 days) per the supply chain finance relationship, the details of which may be included in the one of vendor profiles 44 for the vendor.

Computing device 30 also automatically generates a bank invoice based on the approved final purchase order (110), and sends to customer device 12A the bank invoice for payment by the customer to the bank (112). Computing device 30 may generate the bank invoice with lengthened payment terms (e.g., 60 or 90 days) per the supply chain finance relationship, the details of which may be included in the one of customer profiles 46 for the customer. According to the disclosed techniques, the automatically generated vendor invoice and bank invoice will be accurate because they are based on the approved final purchase order.

Although primary described herein as an invoice generator, computing device 30 of centralized accounting system 22 may alternatively receive a prepared vendor invoice for an approved final purchase order from one of vendor devices 14, e.g., vendor device 14A, and perform an additional vendor invoice approval process. In this case, computing device 30 may approve the prepared vendor invoice based on one or more parameters of the approved final purchase order and at least one of the vendor profile or the customer profile. If the prepared vendor invoice is approved, then computing device 30 may send the prepared vendor invoice to bank server 16, and generate and send a bank invoice based on the approved final purchase order, as described above.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
    providing, by a computing device, data representative of a user interface that comprises a web-based portal accessible by a plurality of customer devices, a plurality of vendor devices, and at least one server of a financial institution in communication via a network;
    receiving, by the computing device and from a customer device of the plurality of customer devices via the user interface, an initial purchase order for one or more products offered by a vendor associated with a vendor device of the plurality of vendor devices;
    upon receipt of the initial purchase order, instantiating, by the computing device, a communication platform of the user interface over which the customer device and the vendor device exchange messages to facilitate negotiation of one or more parameters of the initial purchase order;
    receiving, by the computing device via the user interface, a final purchase order that includes one or more final parameters based on the negotiated parameters of the initial purchase order;
    analyzing, by the computing device, the one or more final parameters of the final purchase order to identify any errors in the final purchase order based on at least one of a vendor profile or a customer profile;
    upon approval of the final purchase order, generating, by the computing device, a vendor invoice based on the final purchase order; and
    sending, by the computing device and to the server of the financial institution, the vendor invoice for payment by the financial institution to the vendor on behalf of a customer associated with the customer device.

2. The method of claim 1, further comprising, upon receipt of the initial purchase order, sending a notification of receipt of the initial purchase order for the vendor to the vendor device.

3. The method of claim 1, wherein the user interface includes a purchase order portal, and wherein receiving the initial purchase order comprises receiving one or more inputs to the purchase order portal from the customer device indicating the one or more parameters of the initial purchase order.

4. The method of claim 3, wherein receiving the final purchase order comprises receiving an input to the purchase order portal from at least the customer device indicating approval of the negotiated parameters of the initial purchase order.

5. The method of claim 1, wherein analyzing the one or more final parameters of the final purchase order comprises comparing each of the final parameters of the final purchase order to an associated preset parameter range indicated in the vendor profile;
    the method further comprising, based on at least one of the final parameters being outside of its associated preset parameter range, sending an error notification alert to at least one of the customer device or the vendor device.

6. The method of claim 1, wherein analyzing the one or more final parameters of the final purchase order comprises comparing a total price of the final purchase order to a preset credit limit for the customer indicated in the customer profile, wherein the preset credit limit for the customer is determined by the financial institution;
    the method further comprising, based on the total price of the final purchase order being greater than the preset credit limit for the customer, sending an error notification alert to at least one of the customer device or the vendor device.

7. The method of claim 1, further comprising:
    upon the approval of the final purchase order, generating an approval number for inclusion on the vendor invoice for the final purchase order; and
    prior to generating the vendor invoice, sending a notification of the approval of the final purchase order to the server of the financial institution, wherein the notification includes the approval number.

8. The method of claim 1, further comprising:
    upon the approval of the final purchase order, generating, by the computing device, a bank invoice based on the final purchase order; and
    sending, by the computing device and to the customer device, the bank invoice for payment by the customer to the financial institution.

9. The method of claim 1, wherein the final purchase order is a first final purchase order and the vendor invoice is a first vendor invoice, the method further comprising:
    approving a second final purchase order;
    receiving a second vendor invoice for the second final purchase order directly from the vendor device;
    analyzing the second vendor invoice based on one or more parameters of the second final purchase order and at least one of the vendor profile or the customer profile to identify any anomalies between the second final purchase order and the second vendor invoice; and
    upon approval of the second vendor invoice, sending the second vendor invoice for payment by the financial institution to the vendor on behalf of the customer.

10. A computing device comprising:
    a memory configured to store at least one of a vendor profile or a customer profile; and
    one or more processors in communication with the memory and configured to:
        provide data representative of a user interface that comprises a web-based portal accessible by a plurality of customer devices, a plurality of vendor devices, and at least one server of a financial institution in communication via a network;
        receive, from a customer device of the plurality of customer devices via the user interface, an initial purchase order for one or more products offered by a vendor associated with a vendor device of the plurality of vendor devices;
        upon receipt of the initial purchase order, instantiating a communication platform of the user interface over which the customer device and the vendor device exchange messages to facilitate negotiation of one or more parameters of the initial purchase order;

receive, via the user interface, a final purchase order that includes one or more final parameters based on the negotiated parameters of the initial purchase order;

analyze the one or more final parameters of the final purchase order to identify any errors in the final purchase order based on at least one of a vendor profile or a customer profile;

upon approval of the final purchase order, generate a vendor invoice based on the final purchase order; and send, to the server of the financial institution, the vendor invoice for payment by the financial institution to the vendor on behalf of a customer associated with the customer device.

11. The computing device of claim 10, wherein the one or more processors are configured to, upon receipt of the initial purchase order, send a notification of receipt of the initial purchase order for the vendor to the vendor device.

12. The computing device of claim 10,
wherein the user interface includes a purchase order portal; and
wherein, to receive the initial purchase order, the one or more processors are configured to receive one or more inputs to the purchase order portal from the customer device indicating the one or more parameters of the initial purchase order.

13. The computing device of claim 12, wherein, to receive the final purchase order, the one or more processors are configured to receive an input to the purchase order portal from at least the customer device indicating approval of the negotiated parameters of the initial purchase order.

14. The computing device of claim 10, wherein, to analyze the one or more final parameters of the final purchase order, the one or more processors are configured to:
compare each of the final parameters of the final purchase order to an associated preset parameter range indicated in the vendor profile; and
based on at least one of the final parameters being outside of its associated preset parameter range, send an error notification alert to at least one of the customer device or the vendor device.

15. The computing device of claim 10, wherein the one or more processors are configured to:
upon the approval of the final purchase order, generate an approval number for inclusion on the vendor invoice for the final purchase order; and
prior to generating the vendor invoice, send a notification of the approval of the final purchase order to the server of the financial institution, wherein the notification includes the approval number.

16. A non-transitory computer-readable storage medium comprising instructions that when executed cause one or more processors of a computing device to:
provide data representative of a user interface that comprises a web-based portal accessible by a plurality of customer devices, a plurality of vendor devices, and at least one server of a financial institution in communication via a network;
receive, from a customer device of the plurality of customer devices via the user interface, an initial purchase order for one or more products offered by a vendor associated with a vendor device of the plurality of vendor devices;
upon receipt of the initial purchase order, instantiate a communication platform of the user interface over which the customer device and the vendor device exchange messages to facilitate negotiation of one or more parameters of the initial purchase order;
receive, via the user interface, a final purchase order that includes one or more final parameters based on the negotiated parameters of the initial purchase order;
analyze the one or more final parameters of the final purchase order to identify any errors in the final purchase order based on at least one of a vendor profile or a customer profile;
upon approval of the final purchase order, generate a vendor invoice based on the final purchase order; and
send, to the server of the financial institution, the vendor invoice for payment by the financial institution to the vendor on behalf of a customer associated with the customer device.

17. The method of claim 1, further comprising, upon identification of at least one error in the final purchase order:
sending an error notification alert to at least one of the customer device or the vendor device; and
re-instantiating, by the computing device, the communication platform of the user interface over which the customer device and the vendor device exchange messages to correct the at least one error in the final purchase order.

18. The computing device of claim 10, wherein the one or more processors are configured to, upon identification of at least one error in the final purchase order:
send an error notification alert to at least one of the customer device or the vendor device; and
re-instantiate the communication platform of the user interface over which the customer device and the vendor device exchange messages to correct the at least one error in the final purchase order.

19. The computing device of claim 10, wherein, to analyze the one or more final parameters of the final purchase order, the one or more processors are configured to:
compare a total price of the final purchase order to a preset credit limit for the customer indicated in the customer profile, wherein the preset credit limit for the customer is determined by the financial institution; and
based on the total price of the final purchase order being greater than the preset credit limit for the customer, send an error notification alert to at least one of the customer device or the vendor device.

20. The computing device of claim 10, wherein the final purchase order is a first final purchase order and the vendor invoice is a first vendor invoice, and wherein the one or more processors are configured to:
approve a second final purchase order;
receive a second vendor invoice for the second final purchase order directly from the vendor device;
analyze the second vendor invoice based on one or more parameters of the second final purchase order and at least one of the vendor profile or the customer profile to identify any anomalies between the second final purchase order and the second vendor invoice; and
upon approval of the second vendor invoice, send the second vendor invoice for payment by the financial institution to the vendor on behalf of the customer.

* * * * *